United States Patent
Jones et al.

(10) Patent No.: US 7,267,237 B1
(45) Date of Patent: Sep. 11, 2007

(54) APPARATUS FOR HOLDING A POOL FILTER DURING CLEANING PROCEDURES

(75) Inventors: Robert W. Jones, Boulder City, NV (US); Susan E. Jones, Boulder City, NV (US)

(73) Assignee: Robert William Jones, Boulder City, NV (US)

( * ) Notice: Subject to any disclaimer, the term of this patent is extended or adjusted under 35 U.S.C. 154(b) by 439 days.

(21) Appl. No.: 11/027,137

(22) Filed: Jan. 3, 2005

(51) Int. Cl.
*A47B 53/00* (2006.01)

(52) U.S. Cl. .......................... 211/1.3; 211/172; 211/165

(58) Field of Classification Search ................ 211/1.3, 211/172, 165, 196, 197, 205; 248/166, 167, 248/176.3, 188.6, 188.7
See application file for complete search history.

(56) References Cited

U.S. PATENT DOCUMENTS

| | | | | |
|---|---|---|---|---|
| 1,156,699 | A * | 10/1915 | Hanson | 211/172 |
| 1,220,215 | A * | 3/1917 | Michaud | 211/172 |
| 1,276,300 | A * | 8/1918 | Wideen | 211/172 |
| 1,893,096 | A * | 1/1933 | Michaud | 211/172 |
| 1,973,521 | A * | 9/1934 | Bullard | 211/172 |
| 2,296,043 | A * | 9/1942 | McClary | 248/188 |
| 2,542,137 | A * | 2/1951 | Hanson | 248/171 |
| 3,464,664 | A * | 9/1969 | Nugent | 248/435 |
| D229,650 | S | 12/1973 | Sonnergaard | |
| 3,807,574 | A * | 4/1974 | Lanza | 211/207 |
| 4,012,007 | A | 3/1977 | Cunningham | |
| 253,265 | A | 10/1979 | Miller | |
| 5,330,065 | A | 7/1994 | Bradley | |
| 5,989,419 | A | 11/1999 | Dudley et al. | |
| 6,152,155 | A | 11/2000 | Milligan | |
| 6,702,129 | B1 * | 3/2004 | Harris | 211/196 |
| 6,796,446 | B2 * | 9/2004 | Segall et al. | 211/206 |
| 2003/0037808 | A1 | 2/2003 | Dudley et al. | |

* cited by examiner

Primary Examiner—Jennifer E. Novosad

(57) ABSTRACT

A holding apparatus includes an anchor plate including upper and lower sections and a core member sandwiched medially of the upper and lower sections. A bore passes through the upper and lower sections and the core member. A plurality of elongated support legs are connected to the anchor plate and are adaptable along opposing radial paths. An elongated support rod is included for axially receiving and supporting the filter. The support rod is engageable with the anchor plate such that the support rod becomes aligned along a vertical plane while extending away from the anchor plate. The apparatus further includes a locking wedge having an inverted conical shape and an elongated sleeve formed therein for attaching to the support rod. The locking wedge engages the filter such that the filter becomes positioned between the locking wedge and the anchor plate. The locking wedge includes threadably adjustable spherical gripping members.

18 Claims, 4 Drawing Sheets

APPARATUS FOR HOLDING A POOL FILTER DURING CLEANING PROCEDURES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an apparatus for holding a pool filter and, more particularly, to an apparatus for holding a pool filter during cleaning procedures.

2. Prior Art

Filtration is the physical process of removing dirt particles and solids to prevent impeding the disinfection process and to promote clarity in pool waters. Filtration, capable of removing some bacteria, is not a disinfection process. Disinfection is the chemical process of killing disease-causing bacteria and other types of microorganisms by maintaining a uniformly dispersed residual of some chemical, usually chlorine, in pool waters. The removal of bacteria by filtration is not considered particularly beneficial. The primary purpose of filtration is to remove all foreign particles which would otherwise increase the disinfectant demand of the water, thus lowering chlorine residuals and weakening the killing power of the chemicals that have been added to sterilize the water. Many alternatives are open to designers and builders to accomplish particle removal through filtration.

As the soil removal process takes place in the filter, the dirt accumulation increases resistance to flow and eventually reduces the flow below the specified amount. At that point, the filter must be cleaned. Professionals recommend cleaning the filter when the pump output pressure rises 8-10 PSI above the initial or new cartridge starting pressure. Conversely, when the filter is cleaned and returned to service, resistance to flow is at its minimum and flow is at its maximum. Thus, it can be seen that the swimming pool pump output varies over the filter life of the cartridge.

In order to clean a filter cartridge, it is typically recommended to first remove it from the filter housing, and to then rinse it with a garden hose to remove loose debris. To remove calcium or mineral buildup, the cartridge is soaked in a separate solution of one part muriatic acid to twenty parts water until the bubbling stops. The element is thoroughly rinsed before putting it back in the filter housing. All oils and cleaning solutions must be removed from the cartridge before soaking it in the acid solution, otherwise the acid reactions with the residue will permanently clog the filter material. As is obvious, there are a lot of opportunities for the individual performing the cleaning task to become contaminated themselves with the cleaning chemicals since the filter is being manually manipulated.

Accordingly, a need remains for an apparatus for holding a pool filter during cleaning procedures in order to overcome the above noted shortcomings. The present invention satisfies such a need by providing a filter holding apparatus that is practical, durable in design, and convenient and easy to use. Such an apparatus is lightweight and can be broken down into a compact unit for easy carrying and storage. The apparatus advantageously allows a user to quickly and easily rinse a filter without the need to manually manipulate it. The pool filter holding apparatus appeals to residential owners of pools as well as to public pool owners and maintenance supervisors.

BRIEF SUMMARY OF THE INVENTION

In view of the foregoing background, it is therefore an object of the present invention to provide an apparatus for holding a pool filter during cleaning procedures. These and other objects, features, and advantages of the invention are provided by an apparatus assisting an operator to effectively clean a pool filter.

The apparatus includes an anchor plate that has a centrally disposed axis extending along a vertical plane and includes upper and lower sections vertically spaced and centered about the axis. Such an anchor plate further includes a core member sandwiched medially of the upper and lower sections. The anchor plate is provided with an axially positioned bore passing through the upper and lower sections and the core member respectively such that the anchor plate can be vertically positioned along the axis.

The core member preferably includes a plurality of flange portions radially extending away therefrom and terminating inwardly from the perimeter of the anchor plate. Such flange portions are equidistantly spaced from a center of the anchor plate such that each of the flange portions are aligned with a corresponding one of the support legs respectively. The support legs are pivotally connected to the anchor plate such that the support legs can be selectively biased between horizontal and vertical positions during operating and non-operating conditions respectively.

A plurality of elongated support legs are connected to the anchor plate. Such support legs are selectively adaptable along opposing radial paths equidistantly spaced about a perimeter of the anchor plate. In particular, the support legs are further preferably pivotally connected to the core member.

An elongated support rod is included for axially receiving and supporting the filter at a generally upright position during operating conditions. Such a support rod is engageable with the anchor plate such that the support rod becomes aligned along a substantially vertical plane while extending upwardly away from the anchor plate. The anchor plate and the support legs are vertically displaceable along a longitudinal length of the support rod as desired by a user.

The present invention further includes a locking wedge having an elongated sleeve formed therein that is sized and shaped for removably attaching to a selected portion of the support rod. Preferably, the selected portion of the support rod is defined along an upper end of the support rod and has a threaded outer surface for threadably receiving the locking wedge thereabout. Such a locking wedge engages a top portion of the filter and effectively exerts a downward force against the filter such that the filter becomes medially positioned between the locking wedge and the anchor plate. The locking wedge includes a plurality of threadably adjustable spherical gripping members for assisting the operator to maintain the apparatus at a substantially stable position during operating conditions. Such gripping members are equidistantly spaced about an outer surface of the locking wedge. The locking wedge has an inverted conical shape wherein the outer surface converges downwardly along the axis.

The apparatus may further include a tubular container defining a compartment therein. Such a container is sized and shaped for conveniently simultaneously receiving and housing the anchor plate, the support rod, the support legs, and the locking wedge therein such that the operator can advantageously readily transport the apparatus between remote locations without detaching the support legs from the anchor plate. The tubular container preferably further includes a lid including a handle attached thereto for assisting the operator to transport the apparatus between remote locations. Such a lid is provided with a threaded outer surface for threadably engaging an open top end of the container and for advantageously shielding the apparatus from undesirable foreign debris during transit.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
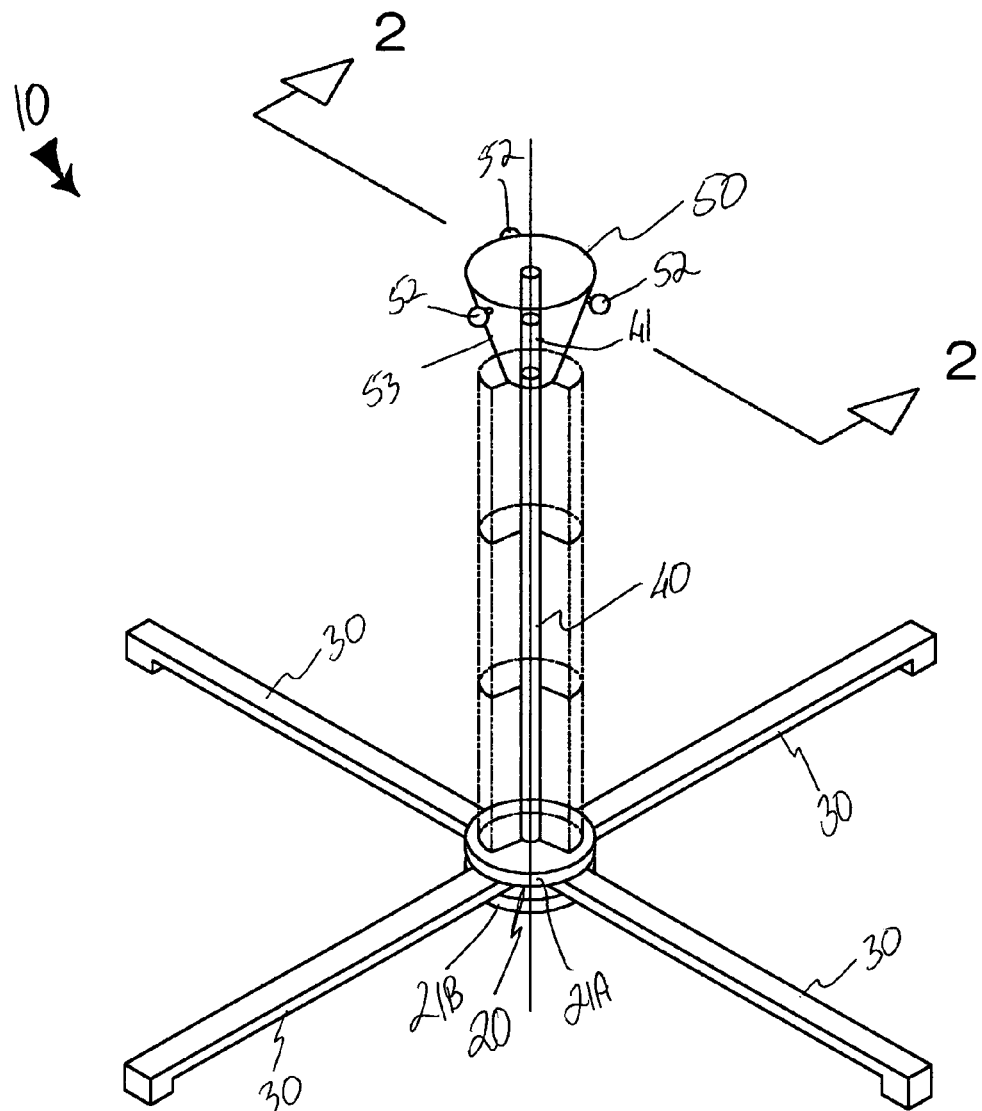
FIG. 1 is a perspective view showing an apparatus for holding a pool filter during cleaning procedures, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide an apparatus for holding a pool filter during cleaning procedures. It should be understood that the apparatus 10 may be used to hold many different types of filters and should not be limited in use to only pool filters.

Referring initially to FIG. 1, the apparatus 10 includes an anchor plate 20 that has a centrally disposed axis extending along a vertical plane and includes upper 21A and lower 21B sections vertically spaced and centered about the axis. Such an anchor plate 20 further includes a core member 22 sandwiched medially of the upper 21A and lower 21B sections. The anchor plate 20 is provided with an axially positioned bore 23 passing through the upper 21A and lower 21B sections and the core member 22 respectively such that the anchor plate 20 can be vertically positioned along the axis.

The core member 22 includes a plurality of flange portions 24 radially extending away therefrom and terminating inwardly from the perimeter of the anchor plate 20. Such flange portions 24 are equidistantly spaced from a center of the anchor plate 20 such that each of the flange portions 24 are aligned with a corresponding one of the support legs 30 (described herein below) respectively. The support legs 30 are pivotally connected to the anchor plate 20 such that the support legs 30 can be selectively biased between horizontal and vertical positions during operating and non-operating conditions respectively. Such a pivoting action of the support legs 30 advantageously allows for the apparatus 10 to assume a smaller size during non-operating conditions than during operating conditions, thus allowing for more convenient and easier storage thereof.

Referring to FIGS. 1 through 4, a plurality of elongated support legs 30 are connected to the anchor plate 20. Such support legs 30 are selectively adaptable along opposing radial paths equidistantly spaced about a perimeter of the anchor plate 20. In particular, the support legs 30 are further pivotally connected to the core member 22. The support legs 30 advantageously stabilize the apparatus 10 during operating conditions, such that the filter (not shown) is not knocked over and damaged or contaminated by foreign debris.

Figure 2:
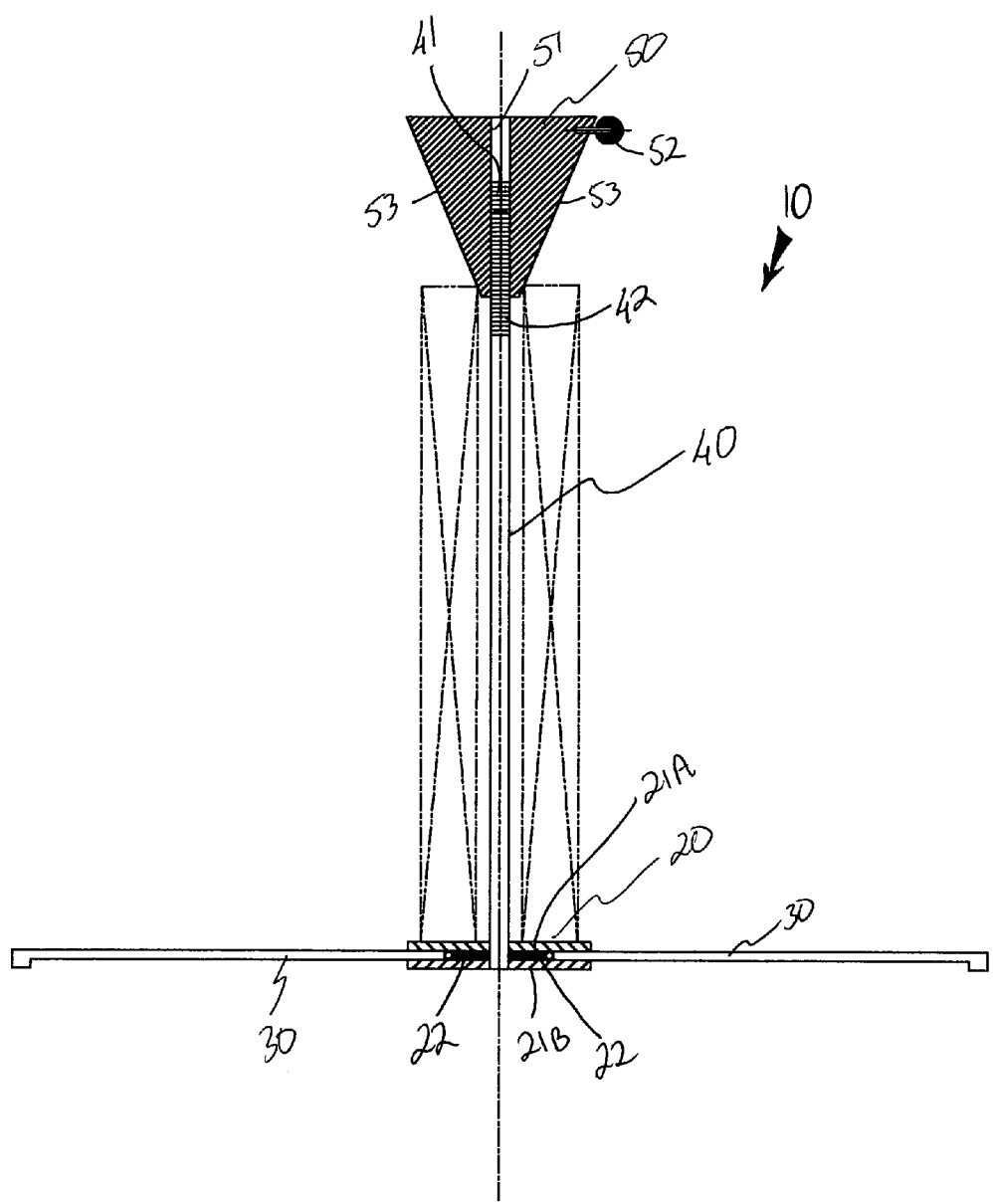
FIG. 2 is a cross-sectional view of the apparatus shown in FIG. 1, taken along line 2-2.
Figure 3:
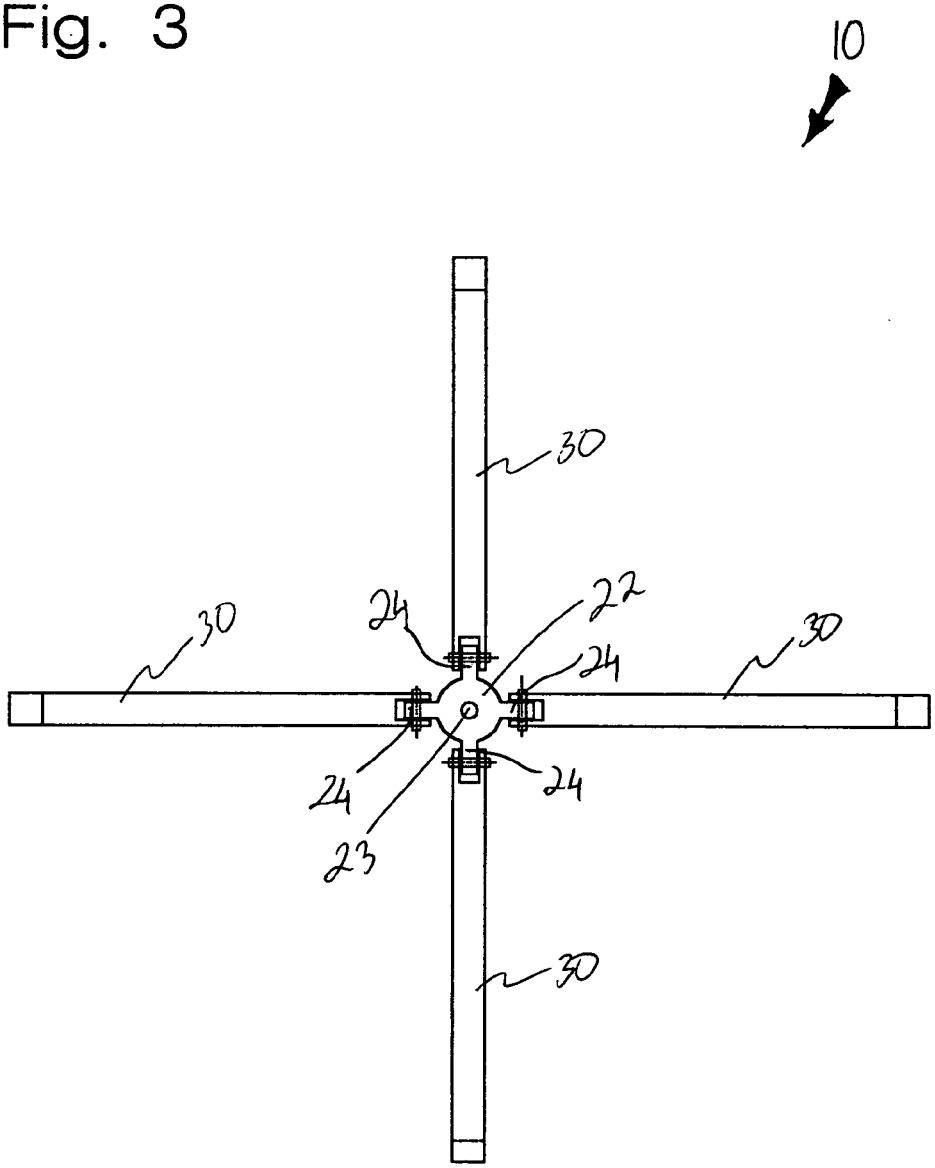
FIG. 3 is a bottom plan view of the apparatus shown in FIG. 1.

Referring FIGS. 1 and 2, an elongated support rod 40 is included for axially receiving and supporting the filter (not shown) at a generally upright position during operating conditions. Such a support rod 40 is engageable with the anchor plate 20 such that the support rod 40 becomes aligned along a substantially vertical plane while extending upwardly away from the anchor plate 20. The anchor plate 20 and the support legs 30 are vertically displaceable along a longitudinal length of the support rod 40 as desired by a user.

Figure 4:
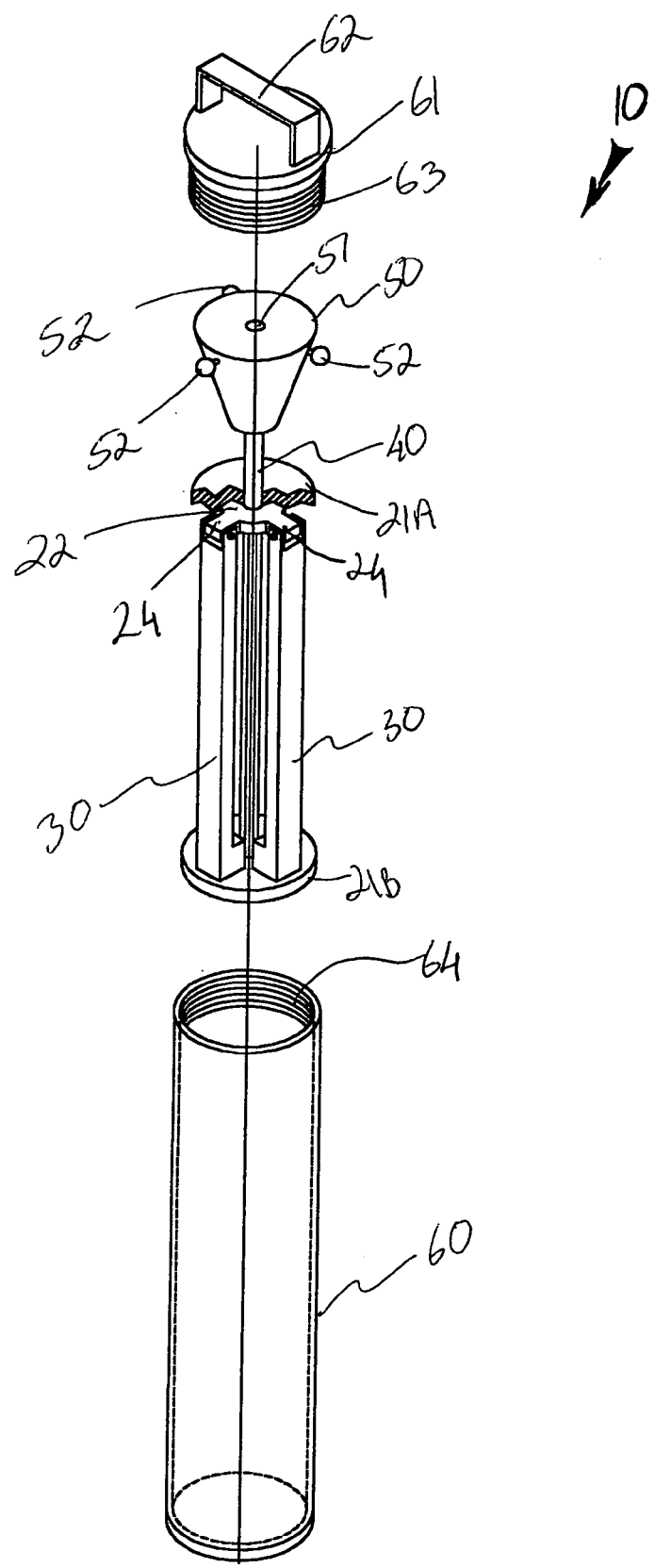
FIG. 4 is a perspective view of the apparatus shown in FIG. 1, showing the tubular container and its associated lid.

Referring to FIGS. 1, 2 and 4, the present invention further includes a locking wedge 50 having an elongated sleeve 51 formed therein that is sized and shaped for removably attaching to a selected portion 41 of the support rod 40. The selected portion 41 of the support rod 40 is defined along an upper end of the support rod 40 and has a threaded outer surface 42 for threadably receiving the locking wedge 50 thereabout. Such a locking wedge 50 engages a top portion of the filter and effectively exerts a downward force against the filter such that the filter becomes medially positioned between the locking wedge 50 and the anchor plate 20. The locking wedge 50 includes a plurality of threadably adjustable spherical gripping members 52 for assisting the operator to maintain the apparatus 10 at a substantially stable position during operating conditions. Such gripping members 52 are equidistantly spaced about an outer surface of the locking wedge 50. The locking wedge 50 has an inverted conical shape wherein the outer surface 53 converges downwardly along the axis.

Referring to FIG. 4, the apparatus 10 further includes a tubular container 60 defining a compartment therein. Such a container 60 is sized and shaped for conveniently simultaneously receiving and housing the anchor plate 20, the support rod 40, the support legs 30, and the locking wedge 50 therein such that the operator can advantageously readily transport the apparatus 10 between remote locations without detaching the support legs 30 from the anchor plate 20. The tubular container 60 further includes a lid 61 including a handle 62 attached thereto for assisting the operator to transport the apparatus 10 between remote locations. Such a lid 61 is provided with a threaded outer surface 63 for threadably engaging an open top end 64 of the container 60 and for advantageously shielding the apparatus 10 from undesirable foreign debris during transit. The tubular container 60 and lid 61 advantageously further protects the components of the apparatus 10 from overexposure to elements in the air that may compromise the proper functioning thereof.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus assisting an operator to effectively clean a pool filter, said apparatus comprising:
    an anchor plate having a centrally disposed axis extending along a vertical plane and including upper and lower sections vertically spaced and centered about the axis, said anchor plate further including a core member sandwiched medially of said upper and lower sections, said anchor plate being provided with an axially positioned bore passing through said upper and lower sections and said core member respectively such that said anchor plate can be vertically positioned along the axis;
    a plurality of elongated support legs connected to said anchor plate, said support legs being selectively adaptable along opposing radial paths equidistantly spaced about a perimeter of said anchor plate;
    an elongated support rod for axially receiving and supporting the filter at a generally upright position during operating conditions, said support rod being engageable with said anchor plate such that said support rod becomes aligned along a substantially vertical plane while extending upwardly away from said anchor plate, said anchor plate and said support legs being vertically displaceable along a longitudinal length of said support rod as desired by a user; and
    a locking wedge having an elongated sleeve formed therein and being sized and shaped for removably attaching to a selected portion of said support rod, said locking wedge engaging a top portion of the filter and exerting a downward force against the filter such that said filter becomes medially positioned between said locking wedge and said anchor plate.

2. The apparatus of claim 1, wherein said selected portion of said support rod is defined along an upper end of said support rod and has a threaded outer surface for threadably receiving said locking wedge thereabout.

3. The apparatus of claim 1, wherein said core member comprises:
    a plurality of flange portions radially extending away therefrom and terminating inwardly from the perimeter of said anchor plate, said flange portions being equidistantly spaced from a center of said anchor plate such that each said flange portions is aligned with a corresponding one of said support legs respectively, said support legs being pivotally connected to said anchor plate such that said support legs can be selectively biased between horizontal and vertical positions during operating and non-operating conditions respectively.

4. The apparatus of claim 1, further comprising:
    a tubular container defining a compartment therein, said container being sized and shaped for simultaneously receiving and housing said anchor plate and said support rod and said support legs and said locking wedge therein such that the operator can readily transport said apparatus between remote locations without detaching said support legs from said anchor plate.

5. The apparatus of claim 4, further comprising:
    a lid including a handle attached thereto for assisting the operator to transport said apparatus between remote locations, said lid being provided with a threaded outer surface for threadably engaging an open top end of said container and for shielding said apparatus from undesirable foreign debris during transit.

6. The apparatus of claim 1, wherein said support legs are pivotally connected to said core member.

7. An apparatus assisting an operator to effectively clean a pool filter, said apparatus comprising:
    an anchor plate having a centrally disposed axis extending along a vertical plane and including upper and lower sections vertically spaced and centered about the axis, said anchor plate further including a core member sandwiched medially of said upper and lower sections, said anchor plate being provided with an axially positioned bore passing through said upper and lower sections and said core member respectively such that said anchor plate can be vertically positioned along the axis;
    a plurality of elongated support legs connected to said anchor plate, said support legs being selectively adaptable along opposing radial paths equidistantly spaced about a perimeter of said anchor plate;
    an elongated support rod for axially receiving and supporting the filter at a generally upright position during operating conditions, said support rod being engageable with said anchor plate such that said support rod becomes aligned along a substantially vertical plane while extending upwardly away from said anchor plate, said anchor plate and said support legs being vertically displaceable along a longitudinal length of said support rod as desired by a user; and
    a locking wedge having an elongated sleeve formed therein and being sized and shaped for removably attaching to a selected portion of said support rod, said locking wedge engaging a top portion of the filter and exerting a downward force against the filter such that said filter becomes medially positioned between said locking wedge and said anchor plate, said locking wedge including a plurality of threadably adjustable gripping members for assisting the operator to maintain said apparatus at a substantially stable position during operating conditions.

8. The apparatus of claim 7, wherein said selected portion of said support rod is defined along an upper end of said support rod and has a threaded outer surface for threadably receiving said locking wedge thereabout.

9. The apparatus of claim 7, wherein said core member comprises:
a plurality of flange portions radially extending away therefrom and terminating inwardly from the perimeter of said anchor plate, said flange portions being equidistantly spaced from a center of said anchor plate such that each said flange portions is aligned with a corresponding one of said support legs respectively, said support legs being pivotally connected to said anchor plate such that said support legs can be selectively biased between horizontal and vertical positions during operating and non-operating conditions respectively.

10. The apparatus of claim 7, further comprising:
a tubular container defining a compartment therein, said container being sized and shaped for simultaneously receiving and housing said anchor plate and said support rod and said support legs and said locking wedge therein such that the operator can readily transport said apparatus between remote locations without detaching said support legs from said anchor plate.

11. The apparatus of claim 10, further comprising:
a lid including a handle attached thereto for assisting the operator to transport said apparatus between remote locations, said lid being provided with a threaded outer surface for threadably engaging an open top end of said container and for shielding said apparatus from undesirable foreign debris during transit.

12. The apparatus of claim 7, wherein said support legs are pivotally connected to said core member.

13. An apparatus assisting an operator to effectively clean a pool filter, said apparatus comprising:
an anchor plate having a centrally disposed axis extending along a vertical plane and including upper and lower sections vertically spaced and centered about the axis, said anchor plate further including a core member sandwiched medially of said upper and lower sections, said anchor plate being provided with an axially positioned bore passing through said upper and lower sections and said core member respectively such that said anchor plate can be vertically positioned along the axis;
a plurality of elongated support legs connected to said anchor plate, said support legs being selectively adaptable along opposing radial paths equidistantly spaced about a perimeter of said anchor plate;
an elongated support rod for axially receiving and supporting the filter at a generally upright position during operating conditions, said support rod being engageable with said anchor plate such that said support rod becomes aligned along a substantially vertical plane while extending upwardly away from said anchor plate, said anchor plate and said support legs being vertically displaceable along a longitudinal length of said support rod as desired by a user; and
a locking wedge having an elongated sleeve formed therein and being sized and shaped for removably attaching to a selected portion of said support rod, said locking wedge engaging a top portion of the filter and exerting a downward force against the filter such that said filter becomes medially positioned between said locking wedge and said anchor plate, said locking wedge including a plurality of threadably adjustable spherical gripping members for assisting the operator to maintain said apparatus at a substantially stable position during operating conditions, said gripping member being equidistantly spaced about an outer surface of said locking wedge, said locking wedge having an inverted conical shape wherein the outer surface converges downwardly along the axis.

14. The apparatus of claim 13, wherein said selected portion of said support rod is defined along an upper end of said support rod and has a threaded outer surface for threadably receiving said locking wedge thereabout.

15. The apparatus of claim 13, wherein said core member comprises:
a plurality of flange portions radially extending away therefrom and terminating inwardly from the perimeter of said anchor plate, said flange portions being equidistantly spaced from a center of said anchor plate such that each said flange portions is aligned with a corresponding one of said support legs respectively, said support legs being pivotally connected to said anchor plate such that said support legs can be selectively biased between horizontal and vertical positions during operating and non-operating conditions respectively.

16. The apparatus of claim 13, further comprising:
a tubular container defining a compartment therein, said container being sized and shaped for simultaneously receiving and housing said anchor plate and said support rod and said support legs and said locking wedge therein such that the operator can readily transport said apparatus between remote locations without detaching said support legs from said anchor plate.

17. The apparatus of claim 16, further comprising:
a lid including a handle attached thereto for assisting the operator to transport said apparatus between remote locations, said lid being provided with a threaded outer surface for threadably engaging an open top end of said container and for shielding said apparatus from undesirable foreign debris during transit.

18. The apparatus of claim 13, wherein said support legs are pivotally connected to said core member.

* * * * *